United States Patent
Liang et al.

(10) Patent No.: US 9,301,248 B2
(45) Date of Patent: Mar. 29, 2016

(54) METHODS AND APPARATUSES FOR COMMUNICATION IN A PERSONAL AREA NETWORK

(75) Inventors: Zheng Liang, Shanghai (CN); Gang Liu, Shanghai (CN); Jun Zheng, Shanghai (CN); Haibo Wen, Shanghai (CN); Fanxiang Bin, Shanghai (CN); Chunyan Yao, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 271 days.

(21) Appl. No.: 13/996,059

(22) PCT Filed: Dec. 20, 2010

(86) PCT No.: PCT/CN2010/079986
§ 371 (c)(1),
(2), (4) Date: Jun. 20, 2013

(87) PCT Pub. No.: WO2012/083512
PCT Pub. Date: Jun. 28, 2012

(65) Prior Publication Data
US 2013/0271288 A1    Oct. 17, 2013

(51) Int. Cl.
*H04W 52/02* (2009.01)
*H04W 28/16* (2009.01)
*H04W 84/18* (2009.01)
*H04W 76/04* (2009.01)

(52) U.S. Cl.
CPC .......... *H04W 52/0203* (2013.01); *H04W 28/16* (2013.01); *H04W 52/0219* (2013.01); *H04W 52/0229* (2013.01); *H04W 76/048* (2013.01); *H04W 84/18* (2013.01); *Y02B 60/50* (2013.01)

(58) Field of Classification Search
None
See application file for complete search history.

(56) References Cited

U.S. PATENT DOCUMENTS

| 2003/0058817 | A1* | 3/2003 | Asai | 370/331 |
| 2008/0186892 | A1* | 8/2008 | Damnjanovic | 370/311 |
| 2008/0232310 | A1* | 9/2008 | Xu | 370/329 |
| 2009/0104916 | A1* | 4/2009 | Rosa et al. | 455/453 |
| 2009/0154438 | A1 | 6/2009 | Kim et al. | |

(Continued)

FOREIGN PATENT DOCUMENTS

| CN | 101442551 | 5/2009 |
| KR | 20100073559 | 7/2010 |

(Continued)

*Primary Examiner* — Jeffrey M Rutkowski
*Assistant Examiner* — Andre Tacdiran
(74) *Attorney, Agent, or Firm* — Patti & Malvone Law Group, LLC

(57) ABSTRACT

An exemplary technique is provided for communication in a personal area network. The technique includes transmitting, to a personal area network coordinator, joint information of a sensor device indicated by reserved bits and includes a type, a channel access rate, and a latest node buffer occupation rate of the sensor device; receiving, from the personal area network coordinator, information regarding adjusted active duration and duty cycle of the communication of the sensor device; and performing further communication based upon the adjusted active duration and duty cycle. Also, the technique includes receiving, from a sensor device, joint information indicated by reserved bits and includes a type, a channel access rate, and a latest node buffer occupation rate of the sensor device; adjusting an active duration and a duty cycle of the communication of the sensor device; and transmitting information regarding the adjusted active duration and duty cycle to the sensor device.

16 Claims, 8 Drawing Sheets

(56) References Cited

U.S. PATENT DOCUMENTS

| | | | |
|---|---|---|---|
| 2009/0257410 A1* | 10/2009 | Liu | 370/336 |
| 2010/0067435 A1* | 3/2010 | Balachandran | H04L 5/0035 370/328 |
| 2010/0309798 A1* | 12/2010 | Fodor et al. | 370/252 |
| 2011/0158206 A1* | 6/2011 | Shrestha et al. | 370/336 |
| 2012/0057486 A1* | 3/2012 | Abedi et al. | 370/252 |
| 2012/0071098 A1* | 3/2012 | Chebbo et al. | 455/41.2 |

FOREIGN PATENT DOCUMENTS

| | | |
|---|---|---|
| WO | 2007064145 | 6/2007 |
| WO | 2010100012 | 9/2010 |

* cited by examiner

METHODS AND APPARATUSES FOR COMMUNICATION IN A PERSONAL AREA NETWORK

FIELD OF THE INVENTION

Embodiments of the present invention generally relate to wireless communication. More particularly, embodiments of the present invention relate to methods and apparatuses for communication in a Personal Area Network (PAN), such as an IEEE 802.15.4 Wireless Personal Area Network (WPAN).

BACKGROUND OF THE INVENTION

Now there exists an increasing demand and promising trend to integrate multimedia services with Wireless Sensor Networks (WSNs). Hence, amount of various multimedia data, such as an image, audio, video, etc., will grow larger and larger and far exceed that of traditional scalar measurement data. Supporting multimedia applications over WSNs requires a low latency and high communication efficiency at the same time, which brings particular challenges to the resource (e.g., power, memory, and so on) limited WSNs.

It is known that the IEEE 802.15.4 WPAN standard is specifically designed to achieve a low-cost and low-power wireless connectivity among resource limited devices. For example, the IEEE 802.15.4 Medium Access Control (MAC) has presented commonly recognized solutions for implementing a low duty cycle in WPANs. In order to fulfill various application scenarios, the IEEE 802.15.4 provides two operational modes, i.e., Beacon-enabled and Non Beacon-enabled modes, for choice. The Beacon-enabled mode may save energy but limit data throughput by adopting a RF sleep mechanism. In contrast, the Non Beacon-enabled mode may provide higher data throughput but consume significant energy due to continuous RF idle listening.

For scalar sensor devices, energy efficiency is a primary concern because scalar measurement traffic is generated at low rates. Therefore, the Beacon-enabled mode would be preferable to the Non Beacon-enabled mode for this case. However, for multimedia sensor devices, the result would be reversed because multimedia data traffic requires higher throughput which is confined by the Beacon-enabled mode. Unfortunately, WPAN operational mode is usually determined and configured at an initialization stage of the network and only one of the modes may be supported at each time. For these reasons, it is difficult for IEEE 802.15.4 to achieve both high energy efficiency and data throughput for the WPANs which would carry multimedia and scalar data traffic at the same time. In addition, when many multimedia sensor devices enter or leave the network after the initialization stage, it is so hard for the network to be adaptive to such variations.

The existing solution to the foregoing problem is the Traffic and Energy Aware IEEE 802.15.4 (TEA-15.4) scheme. In the proposed TEA-15.4, a PAN coordinator can adaptively adjust an active period according to data traffic information of the associated devices in the Beacon-enabled mode. TEA-15.4 employs two mechanisms to inform the PAN coordinator of traffic information. The first one is based upon the Arbitrary Traffic Signal (ATS) (hereinafter as "ATS scheme") and the second one utilizes the Traffic Time-Out (TTO) (hereinafter as "TTO scheme"). The ATS scheme is designed to detect an arbitrary traffic frame or its collision signal that indicates the existence of the data traffic, whereas the TTO scheme utilizes a time-out mechanism to detect the data traffic information of the associated devices. Both mechanisms are periodically performed during sentinel duration, i.e., a special epoch as decided by the PAN coordinator for detecting the traffic information.

The major drawbacks of the ATS scheme are that: 1) additional 40-symbol ATS sentinel frames are introduced and transmitted periodically within one Beacon interval. These frames would lead to additional traffic and energy consumption; 2) the PAN coordinator can make rather rough but not suitable active duration adjustment because the PAN coordinator is unable to obtain, from the ATS frames, sufficient traffic information of overall devices.

The major drawbacks of the TTO scheme are that: 1) TTO introduces periodic 620-symbol sentinel duration within each Beacon interval, so that sensor devices or nodes have to stay much longer in the active mode so as to detect traffic presence, resulting in higher energy consumption; 2) For low data traffic scenarios, TTO wastes too much time and energy in RF idle listening and no adaptation is included in this scheme.

SUMMARY OF THE INVENTION

In view of the foregoing problems in the existing Traffic and Energy Aware IEEE 802.15.4 (TEA-15.4) scheme, there is a need in the art to propose an enhancement scheme to IEEE 802.15.4, which may not only support sufficient data throughput to carry out multimedia communications and services, but also provide high energy efficiency for WSNs.

One embodiment of the present invention provides a method for communication in a personal area network. The method comprises transmitting, to a personal area network coordinator, joint information of a sensor device, wherein the joint information is indicated by reserved bits and includes a type, an overall successful channel access rate, and a latest node buffer occupation rate of the sensor device. The method also comprises receiving, from the personal area network coordinator, information regarding adjusted active duration and duty cycle of the communication of the sensor device, wherein the adjustments of the active duration and duty cycle are determined based upon the joint information. In addition, the method comprises performing further communication based upon the adjusted active duration and duty cycle.

In another embodiment, the joint information is indicated by the reserved bits in a frame control field of a media access control data frame.

In a further embodiment, the type of the sensor device is divided into an energy-saving-first type or a throughput-first type.

In one embodiment, the method comprises using bits included in the reserved bits in a media access control beacon frame control field and transmitted by the personal area network coordinator to set values of the bits indicative of the overall successful channel access rate and the latest node buffer occupation rate.

In one embodiment, combination of bits included in the reserved bits in the media access control beacon frame control field represent various predetermined combination values of the overall successful channel access rate and the latest node buffer occupation rate against which values of the bits indicative of the overall successful channel access rate and the latest node buffer occupation rate are set.

Another embodiment of the present invention provides a method for communication in a personal area network. The method comprises receiving, from a sensor device, joint information which is indicated by reserved bits and includes a type, an overall successful channel access rate, and a latest node buffer occupation rate of the sensor device. The method also comprises adjusting, based upon the joint information, an active duration and a duty cycle of the communication of the sensor device. In addition, the method comprises transmitting information regarding the adjusted active duration and duty cycle to the sensor device.

In another embodiment, the joint information is indicated by reserved bits in a frame control field of a media access control data frame.

In one embodiment, the method comprises prior to receiving the joint information, transmitting bits included in the reserved bits in a media access control beacon frame control field to the sensor device, wherein combination of the bits represent various predetermined combination values of the overall successful channel access rate and the latest node buffer occupation rate against which values of the bits indicative of the overall successful channel access rate and the latest node buffer occupation rate in the joint information are set.

In a further embodiment, the type of the sensor device is divided into an energy-saving-first type or a throughput-first type.

In an additional embodiment, the type of the personal area network is dynamically divided into an energy-saving-first type or a throughput-first type based upon the number of the sensor devices of the energy-saving-first type or the throughput-first type, or the amount of the traffic in the person area network.

In one embodiment, the adjusting further comprises the following steps:

calculating a PAN-wide overall successful channel access rate $\overline{SAR}$ based upon a function $F(_{TypeWeight(1),\ SAR(1),\ TypeWeight(2),\ SAR(2),\ \ldots,\ TypeWeight(n),\ SAR(n)})$, wherein TypeWeight(i) denotes a value of the bit indicative of the type of the $i^{th}$ sensor device or a value configured based upon the types of the $i^{th}$ sensor device and the personal area network, SAR(i) denotes a value of the bit indicative of the overall successful channel access rate of the $i^{th}$ sensor device, n denotes a number of the sensor devices in the personal area network;

calculating a PAN-wide latest node buffer occupation rate $\overline{BOR}$ based upon a function $G(_{TypeWeight(1),\ BOR(1),\ TypeWeight(2),\ BOR(2),\ \ldots,\ TypeWeight(n),\ BOR(n)})$, wherein BOR(i) denotes a value of the bit indicative of the latest node buffer occupation rate of the $i^{th}$ sensor device;

calculating an adjustment parameter $\overline{AI}$ based upon a function $H(\overline{SAR},\overline{BOR})$, adjusting the active duration and the duty cycle based upon the adjustment parameter.

In an additional embodiment, the function $$F(TypeWeight(1), SAR(1), TypeWeight(2), SAR(2), \ldots ,$$

$$TypeWeight(n), SAR(n)) = \left(\frac{1}{n}\sum_{i=1}^{n} TypeWeight(i)^K \times SAR(i)^L\right)^{1/L},$$

wherein the K and L are real numbers.

In one embodiment, the function $$G(TypeWeight(1), BOR(1), TypeWeight(2), BOR(2), \ldots ,$$

$$TypeWeight(n), BOR(n)) = \left(\frac{1}{n}\sum_{i=1}^{n} TypeWeight(i)^P \times BOR(i)^Q\right)^{1/Q},$$

wherein the P and Q are real numbers.

In a further embodiment, the function $$H(\overline{SAR}, \overline{BOR}) = \frac{\overline{SAR}}{\overline{BOR}}.$$

In one embodiment, the method comprises adjusting the active duration and the duty cycle based upon a change ratio of the adjustment parameter $\overline{AI}$, wherein the change ratio is calculated based upon the following equation:

$$\text{the change ratio} = \frac{(\overline{AI}_{new} - \overline{AI}_{old})}{\overline{AI}_{old}},$$

wherein the $\overline{AI}_{new}$ denotes the latest $\overline{AI}$ and the $\overline{AI}_{old}$ denotes the previous $\overline{AI}$.

Another embodiment of the present invention provides a method for communication in a personal area network. The method comprise transmitting, to a personal area network coordinator, a guaranteed-time-slots request, wherein the guaranteed-time-slots request includes information regarding a type of a sensor device indicated by a reserved bit, the type being an energy-saving-first type or a throughput-first type.

In one embodiment, the information is indicated by the reserved bit in a guaranteed-time-slots characteristics field of a guaranteed-time-slots request command frame.

One embodiment of the present invention provides a method for communication in a personal area network. The method comprises receiving a guaranteed-time-slots request from a sensor device, wherein the guaranteed-time-slots request includes information regarding a type of the sensor device, the type being an energy-saving-first type or a throughput-first type. The method also comprises determining the type of the sensor device. In addition, the method comprises preferentially allocating time-slots to the sensor device of the throughput-first type.

In one embodiment, the method comprises prior to the allocating, checking whether there are sufficient slots to be allocated, if so, then allocating the slots to the sensor device, otherwise, sequentially dropping the guaranteed-time-slots requests from the sensor devices of the energy-saving-first type until the guaranteed-time-slots request from the sensor device of the throughput-first type is fulfilled.

One embodiment of the present invention provides an apparatus for communication in a personal area network. The apparatus comprises means for transmitting, to a personal area network coordinator, joint information of a sensor device, wherein the joint information is indicated by reserved bits and includes a type, an overall successful channel access rate, and a latest node buffer occupation rate of the sensor device. The apparatus also comprises means for receiving, from the personal area network coordinator, information regarding adjusted active duration and duty cycle of the communication of the sensor device, wherein the adjustments of the active duration and duty cycle are determined based upon the joint information. In addition, the apparatus comprises means for performing further communication based upon the adjusted active duration and duty cycle.

Another embodiment of the present invention provides an apparatus for communication in a personal area network. The apparatus comprises means for receiving, from a sensor device, joint information which is indicated by reserved bits and includes a type, an overall successful channel access rate, and a latest node buffer occupation rate of the sensor device. The apparatus also comprises means for adjusting, based upon the joint information, an active duration and a duty cycle of the communication of the sensor device. In addition, the apparatus comprises means for transmitting information regarding the adjusted active duration and duty cycle to the sensor device.

An additional embodiment of the present invention provides an apparatus for communication in a personal area network. The apparatus comprises means for transmitting, to a personal area network coordinator, a guaranteed-time-slots request, wherein the guaranteed-time-slots request includes information regarding a type of a sensor device indicated by a reserved bit, the type being an energy-saving-first type or a throughput-first type.

Another embodiment of the present invention provides an apparatus communication in a personal area network. The apparatus comprises means for receiving a guaranteed-time-slots request from a sensor device, wherein the guaranteed-time-slots request includes information regarding a type of the sensor device, the type being an energy-saving-first type or a throughput-first type. The apparatus also comprises means for determining the type of the sensor device. In addition, the apparatus comprises means for preferentially allocating time-slots to the sensor device of the throughput-first type.

With certain embodiments of the present invention, the PAN coordinator can make much more reasonable active duration adjustment and GTS allocation by means of the joint information including the type (i.e., throughput-first or energy-saving-first), overall successful channel access rate, and latest node buffer occupation rate of the sensor device. Further, with the flexible rate level division scheme, good adaptability and flexibility for transmission of both multimedia and scalar data traffic at the same time in various wireless sensor networks are provided.

In addition, the present invention allows adaptively adjusting the active duration and duty-cycle according to dynamic variations of the PAN type. This unique benefit cannot be obtained through the traditional one-time adjustment scheme. Furthermore, no additional sentinel frames are needed and transmitted within one Beacon interval in the present invention. Also, the present invention needs no additional sentinel duration and thus brings no additional communication overheads.

In short, the above advantages of the present invention can result in a good balance between the high throughput and high energy efficiency, which is the key to support multimedia services in low rate and low power wireless sensor networks.

Other features and advantages of the embodiments of the present invention will also be understood from the following description of specific embodiments when read in conjunction with the accompanying drawings, which illustrate, by way of example, the principles of embodiments of the invention.

BRIEF DESCRIPTION OF THE DRAWINGS

The embodiments of the invention are presented in the sense of examples and their advantages are explained in greater detail below with reference to the accompanying drawings, in which.

DETAILED DESCRIPTION OF EMBODIMENTS

Embodiments of the present invention will be described in detail as below.

In one embodiment of the present invention, the joint information, indicated by reserved bits in the MAC data frame control field and including the type, overall successful channel access rate, and latest node (i.e., the sensor device) buffer occupation rate of the sensor device, is delivered to the PAN coordinator. Upon receipt of the joint information, the PAN coordinator may adjust the current active duration and duty cycle of the sensor device based thereupon. Then, the PAN coordinator may transmit information regarding adjusted active period and duty cycle to the sensor device such that the sensor device may continue to communicate based upon the adjusted active period and duty cycle. In another embodiment of the present invention, information regarding the type of the sensor device is indicated by reserved bits in the GTS characteristics field of the GTS request command frame such that the sensor device of the throughput-first type may be preferentially served.

Figure 1:
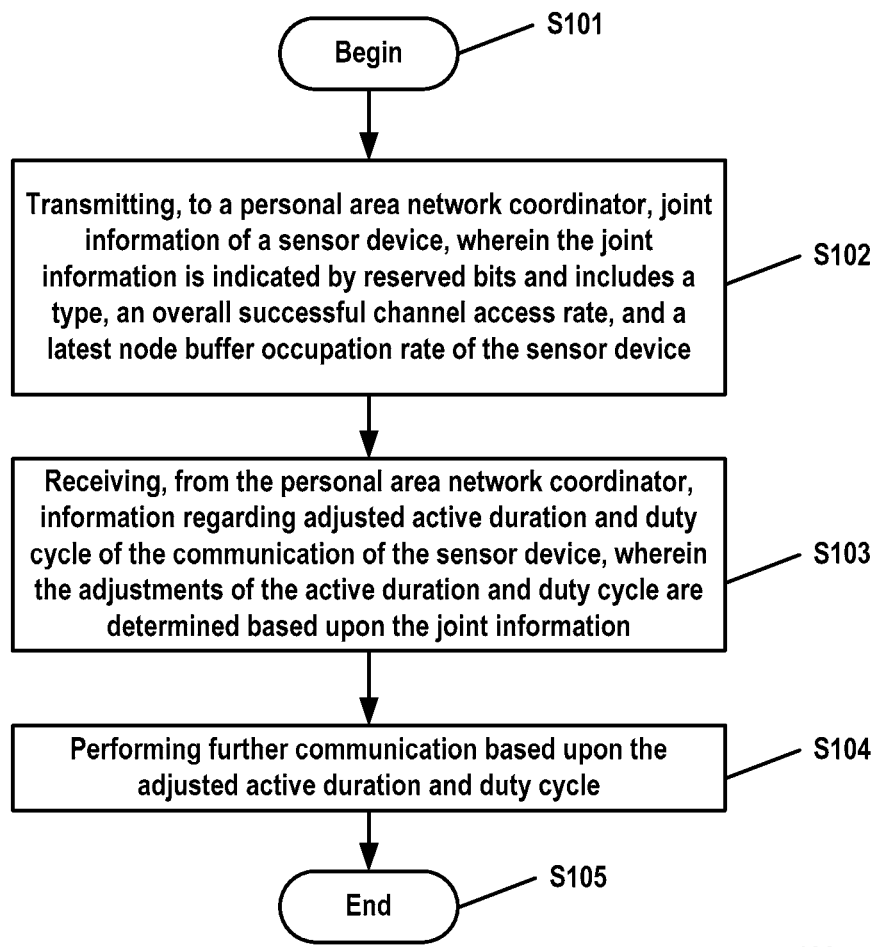
FIG. 1 is a simplified flow diagram exemplarily illustrating a method for communication in a personal area network according to an embodiment of the present invention.

FIG. 1 is a simplified flow diagram exemplarily illustrating a method 100 for communication in a personal area network according to an embodiment of the present invention. As illustrated in FIG. 1, the method begins at step S101 and at step S102, the method 100 transmits, to a personal area network coordinator, joint information of a sensor device, wherein the joint information is indicated by reserved bits and includes a type, an overall successful channel access rate, and a latest node buffer occupation rate of the sensor device. In the present invention, the sensor devices are divided into two types, i.e., the throughput-first and energy-saving-first types. Generally, multimedia and scalar sensors are considered as the throughput-first and energy-saving-first type respectively. The overall successful channel access rate is recorded by the sensor device during one contention access period (CAP) and indicates the channel access competition condition. The latest node buffer occupation rate indicates not only the amount of pending traffic but also the risk of buffer overflow in the sensor device. For convenient conveyance, these two rates are expressed by discrete levels (i.e., bits) according to some rate level division schemes, which will be discussed in detail later.

Figure 2:
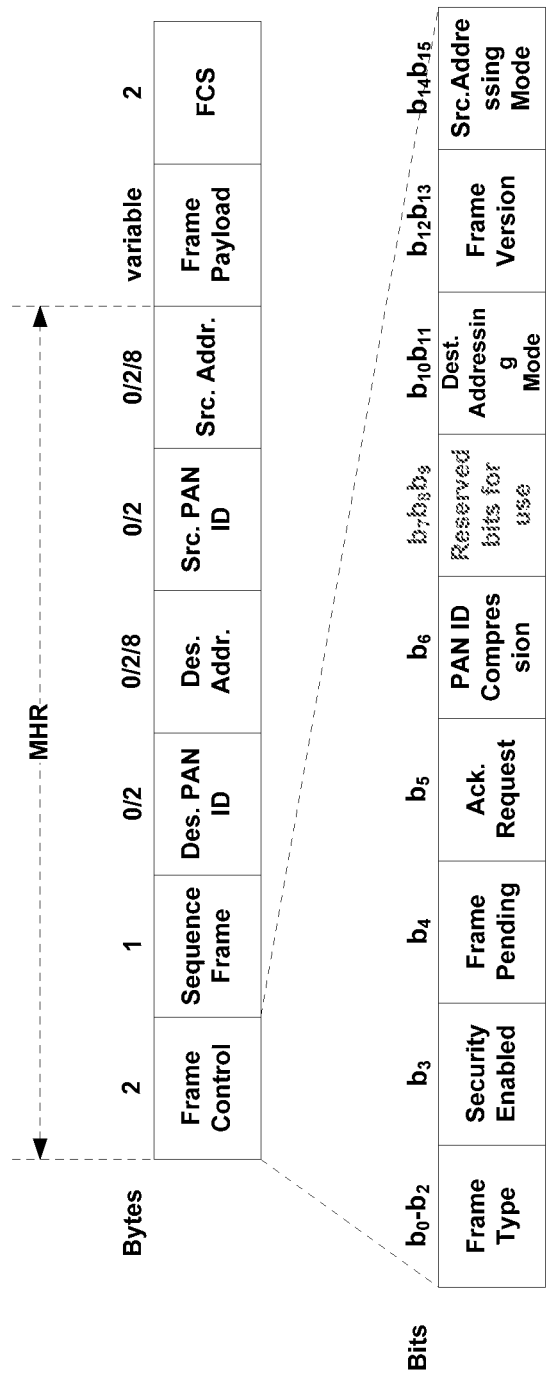
FIG. 2 illustrates a structure diagram of a general MAC frame format and its frame control field to be used according to an embodiment of the present invention.

In one embodiment, the joint information including the type, overall successful channel access rate, and latest node buffer occupation rate of the sensor device is indicated by reserved bits ($b_7$, $b_8$, $b_9$) in the Frame Control field of IEEE 802.15.4 MAC Data frame format, as illustrated in FIG. 2, without introduction of any traffic indication frame or specific sentinel duration.

Subsequent to transmitting the joint information of the sensor device, the method 100 proceeds to step S103 where it receives, from the personal area network coordinator, information regarding adjusted active duration and duty cycle of the communication of the sensor device, wherein the adjustments of the active duration and duty cycle are determined based upon the joint information. As is known to those skilled in the art, the active duration is a time period in which the sensor device is allowed to communicate while the duty cycle is a ratio resulting from the active duration divided by the sum of the active duration plus a sleeping duration in which the sensor device does not communicate. In addition, the adjustment may be determined by the PAN coordinator after taking its type into account where necessary. Similar to the types of the sensor devices, in the present invention, the PAN may also be divided into two types, i.e., the throughput-first and energy-saving-first types. However, different to the fixed type of the sensor device, the type of the PAN may be dynamically divided into the energy-saving-first type or throughput-first type based upon the number of the sensor devices of the energy-saving-first type or the throughput-first type, or the amount of the traffic in the person area network. For example, if the number of the sensor devices of the throughput-first type is bigger than that of those of the energy-saving-first type, then the PAN is a PAN of the throughput-first type. The type of the PAN may be indicated from one of the reserved bits, i.e., $b_7$ bit, in the Frame Control field of IEEE 802.15.4 MAC Beacon frame format. The following table 1 shows the description details.

TABLE 1

Value of the Reserved Bit in the MAC Beacon Frame Control field for the PAN Type Indication

| Reserved Bits Value $b_7$ | Description |
| --- | --- |
| 0 | energy-saving-first PAN |
| 1 | throughput-first PAN |

Then, the method 100 proceeds to step S104. At step S104, the method 100 performs further communication based upon the adjusted active duration and duty cycle. Finally, the method 100 ends at step S105. It can be seen that the method 100 may be implemented by the sensor device.

With the method 100 of the present invention, the PAN coordinator can make much more reasonable active period adjustment by means of the joint information. Additionally, the active duration and duty cycle may be adjusted adaptively according to variations of the networks, e.g., change of the joint information of the sensor devices or the type of the PAN.

Figure 3:
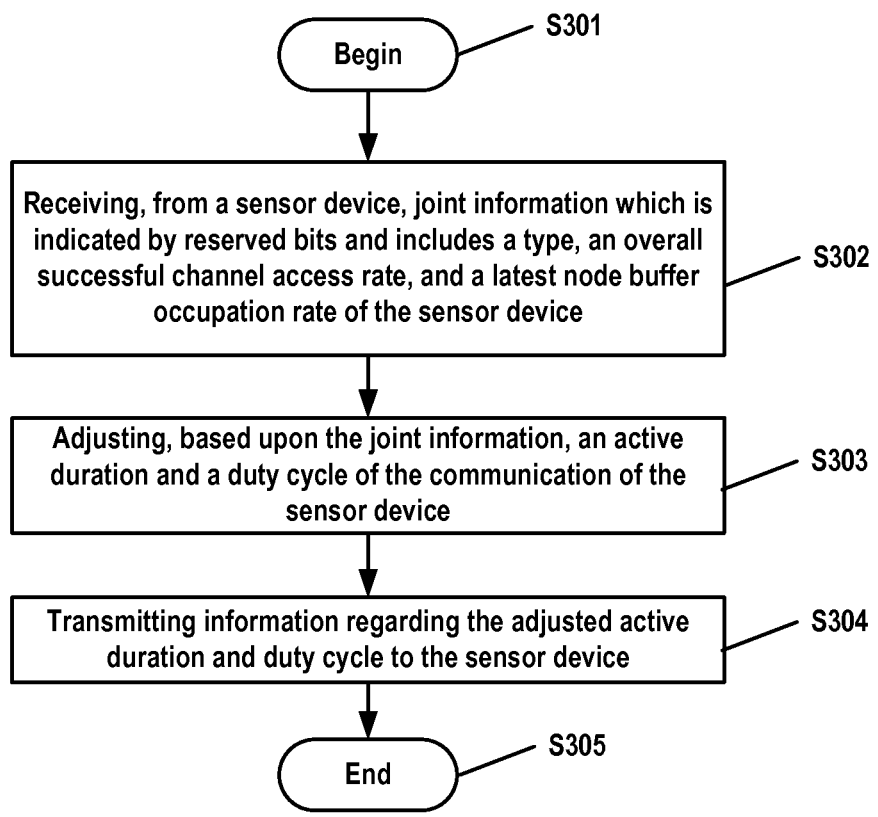
FIG. 3 is a simplified flow diagram exemplarily illustrating another method for communication in a personal area network according to an embodiment of the present invention.

FIG. 3 is a simplified flow diagram exemplarily illustrating another method 300 for communication in a personal area network according to an embodiment of the present invention. As illustrated in FIG. 3, the method 300 begins at step S301 and at step S302, the method receives, from a sensor device, joint information which is indicated by reserved bits and includes a type, an overall successful channel access rate, and a latest node buffer occupation rate of the sensor device. Then, the method 300 proceeds to step S303 where it adjusts, based upon the joint information, an active duration and a duty cycle of the communication of the sensor device. Subsequent to step S303, the method 300 transmits the information regarding the adjusted active duration and duty cycle to the sensor device at step S304. Finally, the method 300 ends at step S305. It can be seen that the method 300 may be implemented by the PAN coordinator.

Figure 4:
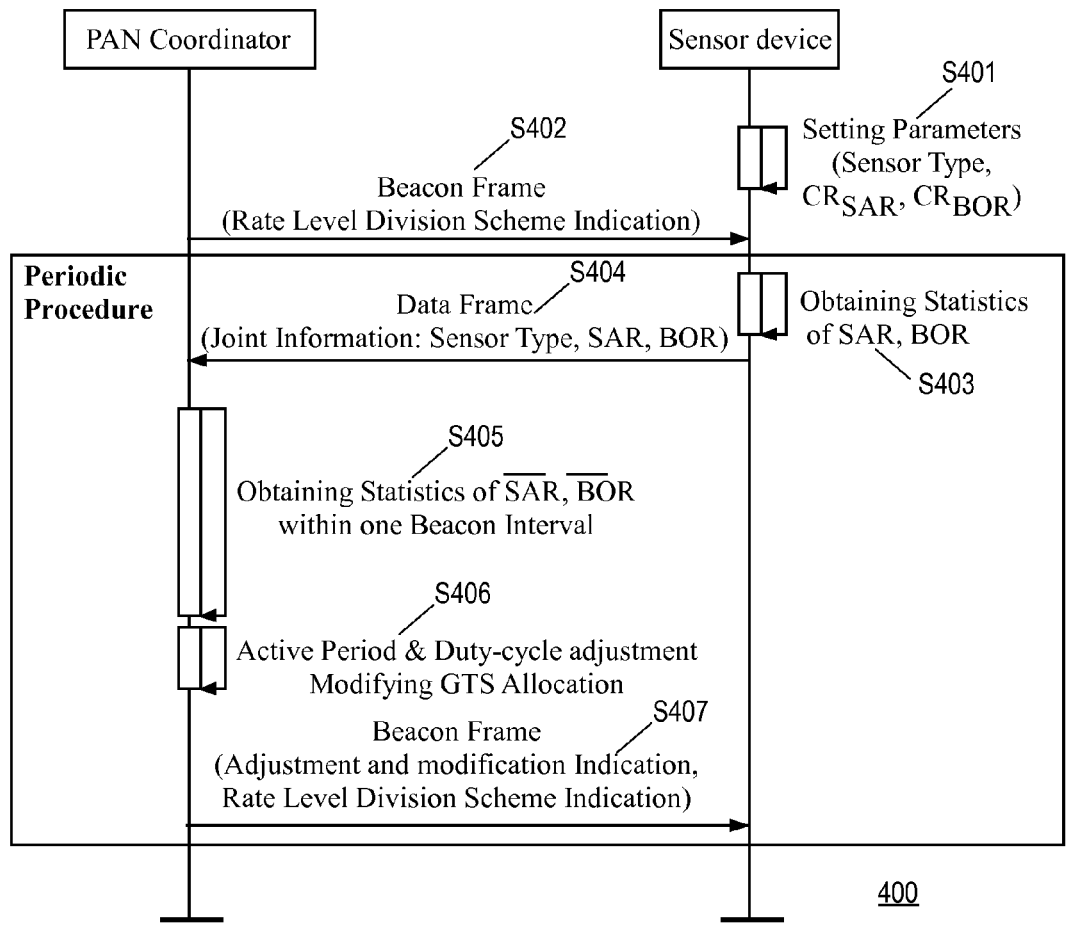
FIG. 4 is a detailed flow diagram exemplarily illustrating a method for communication in a personal area network according to an embodiment of the present invention.
Figure 4:
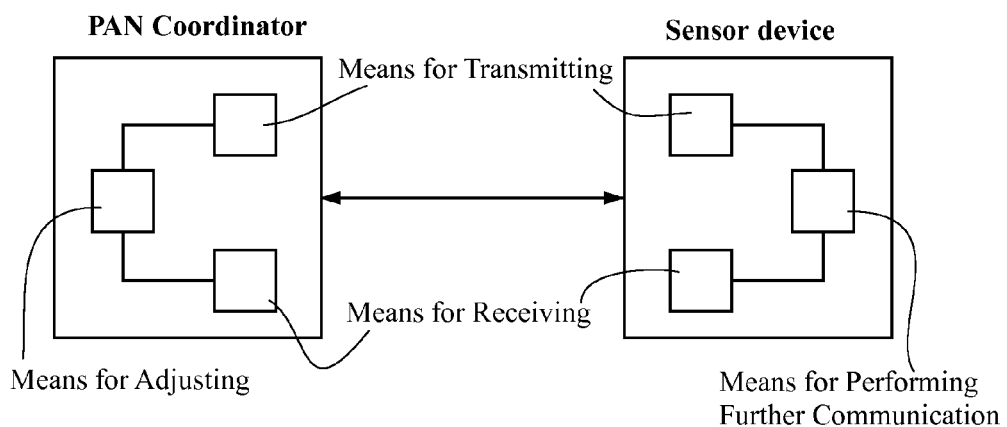

FIG. 4 is a detailed flow diagram exemplarily illustrating a method 400 for communication in a personal area network according to an embodiment of the present invention. As illustrated in FIG. 4, at S401, the sensor device sets parameters including the type of the sensor device, $CR_{SAR}$ and $CR_{BOR}$, where the $CR_{SAR}$ and $CR_{BOR}$ denote the critical values of the overall successful channel access rate and latest node buffer occupation rate, respectively. Detailed configurations of the $CR_{SAR}$ and $CR_{BOR}$ are illustrated as but not limited to those as shown in table 2.

TABLE 2

Values of the Reserved Bits in the MAC Beacon Frame Control field for indexing Rate Level Division Scheme

| Reserved Bits Value $b_8 b_9$ | Description |
| --- | --- |
| 00 | $CR_{SAR}$ = 25% and $CR_{BOR}$ = 25% |
| 01 | $CR_{SAR}$ = 25% and $CR_{BOR}$ = 50% |
| 10 | $CR_{SAR}$ = 50% and $CR_{BOR}$ = 25% |
| 11 | $CR_{SAR}$ = 50% and $CR_{BOR}$ = 50% |

In the right column of the table 2, illustrated are four kinds of combination values of the overall successful channel access rate and the latest node buffer occupation rate. Because the overall successful channel access rate and latest node buffer occupation rate need to be expressed into discrete levels, a rate level division scheme should be introduced into the level determination. When the PAN coordinator informs the sensor devices of the rate level division scheme being used during one beacon interval by the reserved bits ($b_8$, $b_9$) in the frame control field of the IEEE 802.15.4 MAC Beacon frame format at step S402 of the method 400, the sensor device will take one kind of combination values of $CR_{SAR}$ and $CR_{BOR}$ as a reference. For example, if the PAN coordinator transmits the bits $b_8,b_9$ (1,0), then combination values of $CR_{SAR}$=50% and $CR_{BOR}$=25% will be taken as a reference against which values of the bits indicative of the overall successful channel access rate and the latest node buffer occupation rate are set.

After setting the above parameters, the method 400 proceeds to step S403 in which the joint information will be formed. As previously mentioned, the joint information of the sensor device includes the type, overall successful channel access rate, and latest node buffer occupation rate of the sensor device. This information is delivered to the PAN coordinator by the reserved bits in the Frame Control field of the MAC data frame. As shown in FIG. 2, the Frame Control field is two-bytes in length, and $b_7$, $b_8$, $b_9$ bits in this field are reserved. In the present invention, the $b_7$, $b_8$, $b_9$ bits of the Frame Control field in the MAC Data frame format are used to indicate the joint information. More specifically, for the $b_7$ bit: 1 (0) means that the sensor device is of the throughput-first (energy-saving-first) type. For the $b_8$ bit: 1 (0) means that the overall successful channel access rate is at high (low) level. For the $b_9$ bit: 1 (0) means that the latest node buffer occupation rate is at high (low) level. Table 3 shows the descriptions of these reserved bits values in detail.

TABLE 3

Values of the Reserved Bits in the MAC Data Frame Control field

| Reserved Bits Value $b_7b_8b_9$ | Description |
| --- | --- |
| 000 | energy-saving-first sensor, low overall successful channel access rate, low latest node buffer occupation rate |
| 001 | energy-saving-first sensor, low overall successful channel access rate, high latest node buffer occupation rate |
| 010 | energy-saving-first sensor, high overall successful channel access rate, low latest node buffer occupation rate |
| 011 | energy-saving-first sensor, high overall successful channel access rate, high latest node buffer occupation rate |
| 100 | throughput-first sensor, low overall successful channel access rate, low latest node buffer occupation rate |
| 101 | throughput-first sensor, low overall successful channel access rate, high latest node buffer occupation rate |
| 110 | throughput-first sensor, high overall successful channel access rate, low latest node buffer occupation rate |
| 111 | throughput-first sensor, high overall successful channel access rate, high latest node buffer occupation rate |

How to determine whether the overall successful channel access rate and the latest node buffer occupation rate is at high or low level (i.e., the values of $b_8$ and $b_9$ bits) are discussed as below, taking the fourth line of the table 2 as example.

If the overall successful channel access rate is bigger (smaller) than 50%, then it is considered as being at high (low) level, i.e., setting as 1 (0). Similarly, if the latest node buffer occupation rate is bigger (smaller) than 25%, then it is thought to be at high (low) level, i.e., setting as 1 (0). Obviously, different predefined configurations of the $CR_{SAR}$ and $CR_{BOR}$ lead to various results of the different levels as shown in values of the bits $b_8$, $b_9$ of table 2, which makes adjustment schemes of the present invention much more flexible for different application scenarios.

After forming the foregoing joint information, the sensor device transmits the data frame to the PAN coordinator as step S404. At step S405, the PAN coordinator obtains statistics of a PAN-wide overall successful channel access rate $\overline{SAR}$ and a PAN-wide latest node buffer occupation rate $\overline{BOR}$ based upon the joint information. How to obtain the statistics will be discussed in detail as below.

First, the PAN coordinator calculates the $\overline{SAR}$ based upon a function $F_{(TypeWeight(1), SAR(1), TypeWeight(2), SAR(2), \ldots, TypeWeight(n), SAR(n))}$ which may be expressed by any suitable forms as known by those skilled in the art under the teaching of the present invention, wherein the TypeWeight(i) denotes a value of the bit indicative of the type of the $i^{th}$ sensor device or a value configured based upon the types of the $i^{th}$ sensor device and the personal area network, SAR(i) denotes a value of the bit indicative of the overall successful channel access rate of the $i^{th}$ sensor device, n denotes a number of the sensor devices in the personal area network.

Preferably, the function $F(\ldots)$ may be expressed as below:

$$F(TypeWeight(1), SAR(1), TypeWeight(2), SAR(2), \ldots,$$
$$TypeWeight(n), SAR(n)) = \left(\frac{1}{n}\sum_{i=1}^{n} TypeWeight(i)^K \times SAR(i)^L\right)^{1/L},$$

wherein the K and L are real numbers.

Let K and L equal to 1, then make $$\overline{SAR} = \frac{\sum_{i=1}^{n} TypeWeight(i) \times SAR(i)}{n}.$$

Note that a bigger (smaller) $\overline{SAR}$ means a lighter (heavier) channel competition and smaller (bigger) packet delay. Further, configurations of TypeWeight for different PAN types are illustrated as but not limited to the following tables 4 and 5.

TABLE 4

TypeWeight value configuration for throughput-first PAN

| Type of sensor device | TypeWeight value |
| --- | --- |
| throughput-first | 1.0 |
| energy-saving-first | 0.3 |

TABLE 5

TypeWeight value configuration for energy-saving-first PAN

| Type of sensor device | TypeWeight value |
| --- | --- |
| throughput-first | 0.2 |
| energy-saving-first | 1.0 |

Second, the PAN coordinator calculates $\overline{BOR}$ based upon a function $G_{(TypeWeight(1), BOR(1), TypeWeight(2), BOR(2), \ldots, TypeWeight(n), BOR(n))}$ which may be expressed by any suitable forms as known by those skilled in the art under the teaching of the present invention, wherein BOR(i) denotes a value of the bit indicative of the latest node buffer occupation rate of the $i^{th}$ sensor device.

Preferably, the function $G(\ldots)$ may be expressed as below:

$$G(TypeWeight(1), BOR(1), TypeWeight(2), BOR(2), \ldots,$$
$$TypeWeight(n), BOR(n)) = \left(\frac{1}{n}\sum_{i=1}^{n} TypeWeight(i)^P \times BOR(i)^Q\right)^{1/Q},$$

wherein the P and Q are real numbers.

Let P and Q equal to 1, then make $$\overline{BOR} = \frac{\sum_{i=1}^{n} TypeWeight(i) \times BOR(i)}{n}.$$

Note that a bigger (smaller) $\overline{BOR}$ means a heavier (lighter) pending traffic.

Subsequent to obtaining the statistics of the $\overline{SAR}$ and $\overline{BOR}$, at step S406, the PAN coordinator calculates an adjustment parameter $\overline{AI}$ based upon a function H ($\overline{SAR},\overline{BOR}$) which may be expressed by any suitable forms as known by those skilled in the art under the teaching of the present invention. Preferably, $$\overline{AI} = H(\overline{SAR}, \overline{BOR}) = \frac{\overline{SAR}}{\overline{BOR}}.$$

Based upon the foregoing adjustment parameter, the PAN coordinator may adjust the active duration and the duty cycle. For the case of bigger $\overline{AI}$, the duty cycle may become smaller for energy saving. Otherwise, the duty cycle may become bigger for increasing data throughput. In addition, the PAN coordinator may adjust the active duration and the duty cycle based upon a change ratio of the adjustment parameter $\overline{AI}$, wherein the change ratio is calculated based upon the following equation:

$$\text{the change ratio} = \frac{(\overline{AI}_{new} - \overline{AI}_{old})}{\overline{AI}_{old}},$$

wherein $\overline{AI}_{new}$ denotes the latest $\overline{AI}$ and the $\overline{AI}_{old}$ denotes the previous $\overline{AI}$. The duty cycle adjustment with the change ratio of the $\overline{AI}$ is illustrated as but not limited to the following table 6. The active duration then may be adjusted based upon the change of the duty cycle according to the standard IEEE 802.15.4.

TABLE 6

Adjustment of Duty-Cycle according to Change Ratio of $\overline{AI}$

| Change Ratio of $\overline{AI}$ ($\overline{AI}_{new} - \overline{AI}_{old})/\overline{AI}_{old}$ | Duty Cycle Adjustment Description |
|---|---|
| >30% | −20% |
| 10%~30% | −10% |
| −10%~10% | 0 |
| −30%~−10% | 10% |
| <−30% | 20% |

Subsequent to obtaining the adjustment results, at step S407, the PAN coordinator transmits information regarding the adjusted active duration and duty cycle to the sensor devices in the next beacon frame, together with the rate level division scheme indicated by the reserved bits ($b_8$, $b_9$) in the frame control field of the IEEE 802.15.4 MAC Beacon frame format where necessary.

As illustrated in FIG. 4, steps of S401 and S402 are only initialization steps and may be configured in advance while steps of S403, S404, S405, S406, and S407 constitute a periodic procedure due to dynamic characteristic of the PAN. With the method 400 of the present invention, the PAN coordinator may have a capability of dynamically and adaptively updating the active duration and duty cycle of the sensor device. The architecture diagram shown with the detailed flow diagram of FIG. 4 illustrates an architecture that may implement the steps of FIG. 1, FIG. 3 and FIG. 4.

Figure 5:
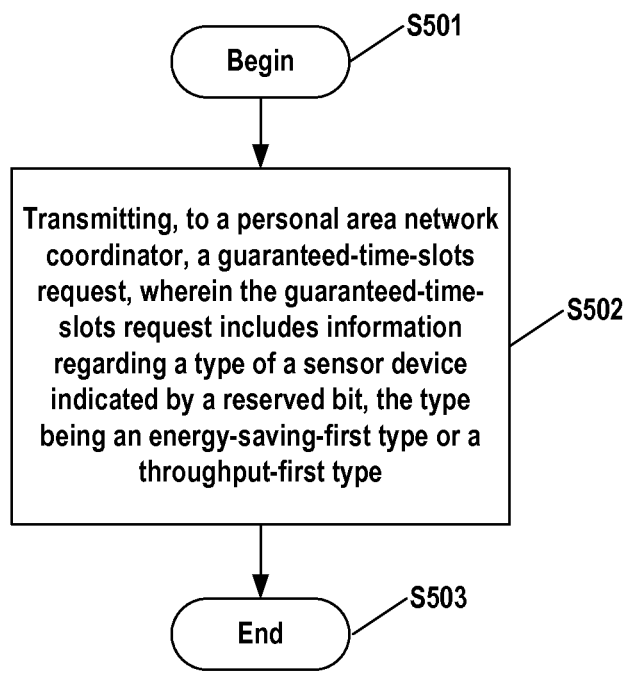
FIG. 5 is a simplified flow diagram exemplarily illustrating a further method for communication in a personal area network according to an embodiment of the present invention.
Figure 6:
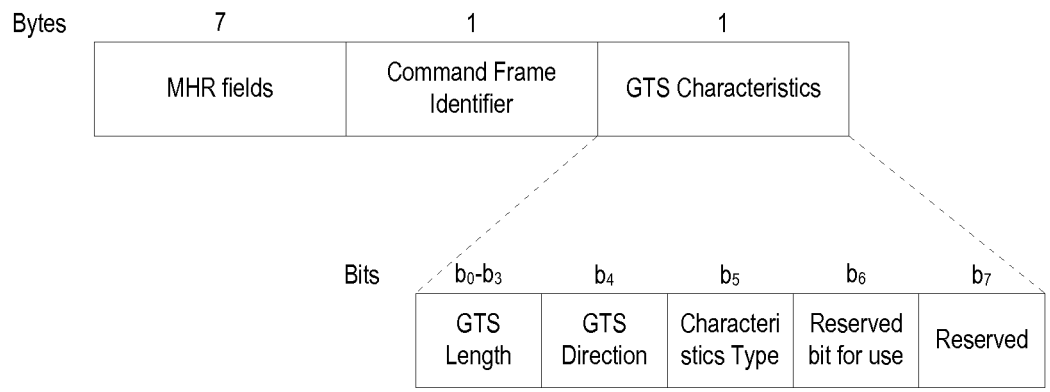
FIG. 6 illustrates a structure diagram of a general GTS request command frame format and its GTS characteristics field to be used according to another embodiment of the present invention.

FIG. 5 is a simplified flow diagram exemplarily illustrating a further method 500 for communication in a personal area network according to an embodiment of the present invention. As illustrated in FIG. 5, the method 500 begins at step S501 and at step S502, the method transmits, to a personal area network coordinator, a guaranteed-time-slots (GTS) request, wherein the guaranteed-time-slots request includes information regarding a type of a sensor device indicated by a reserved bit, the type being an energy-saving-first type or a throughput-first type. Particularly, the type of the sensor device is indicated by the reserved bit for use in a guaranteed-time-slots characteristics field of a guaranteed-time-slots request command frame, as illustrated in FIG. 6 and the following table 7. Then, the method 500 ends at step S503.

TABLE 7

Value of the Reserved Bit in GTS Characteristics field for Sensor Type Indication

| Reserved Bits Value $b_6$ | Description |
|---|---|
| 0 | energy-saving-first sensor device |
| 1 | throughput-first sensor device |

Figure 7:
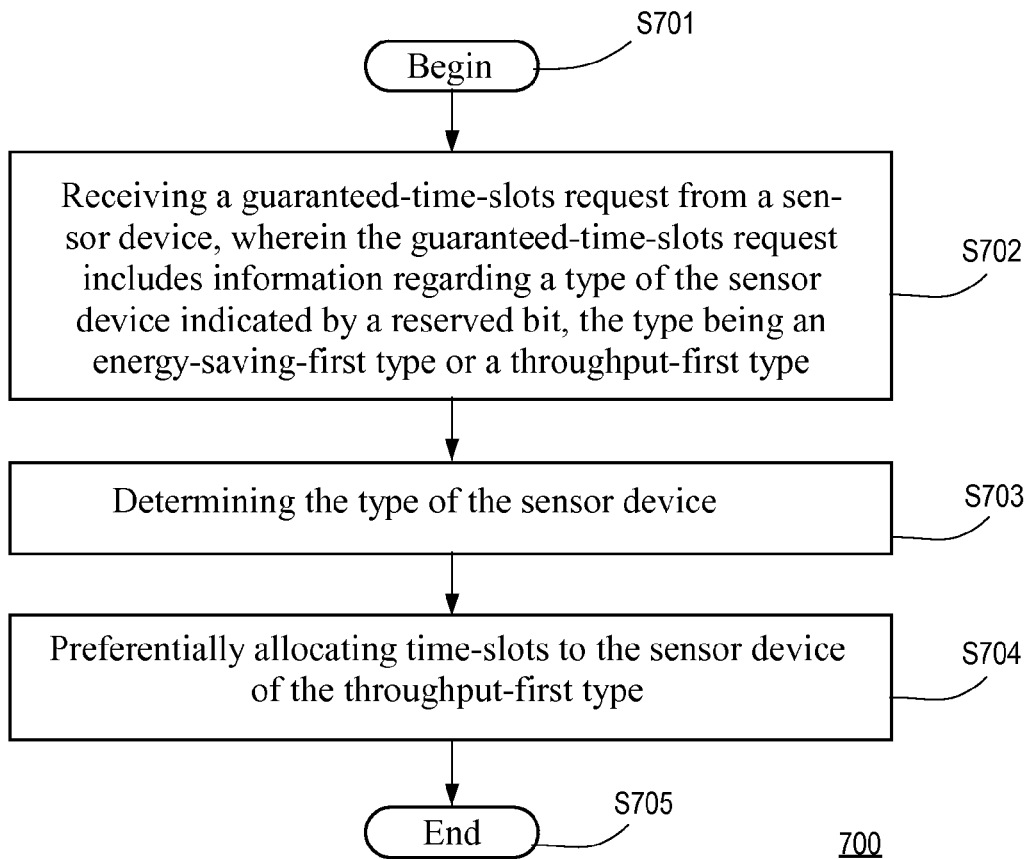
FIG. 7 is a simplified flow diagram exemplarily illustrating an additional method for communication in a personal area network according to an embodiment of the present invention.
Figure 7:
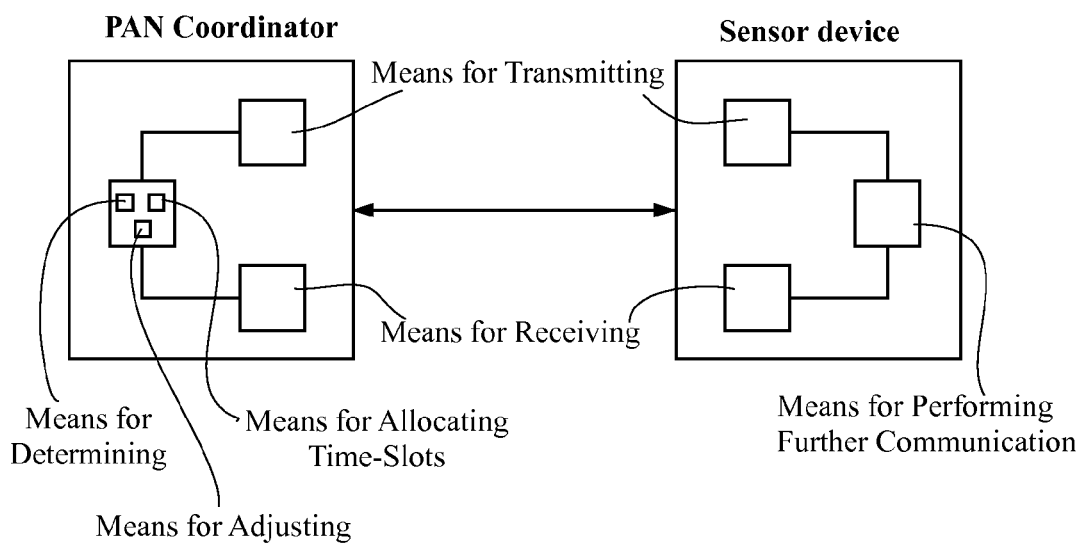

FIG. 7 is a simplified flow diagram exemplarily illustrating an additional method 700 for communication in a personal area network according to an embodiment of the present invention. As illustrated in FIG. 7, the method 700 begins at step S701 and proceeds to step S702 where it receives a guaranteed-time-slots request from a sensor device, wherein the guaranteed-time-slots request includes information regarding a type of the sensor device indicated by a reserved bit, the type being an energy-saving-first type or a throughput-first type. Then, the method 700 determines the type of the sensor device at step S703. At step S704, the method 700 preferentially allocates time-slots to the sensor device of the throughput-first type. Alternatively or preferably, prior to the allocating, the method 700 checks whether there are sufficient slots to be allocated, if so, then allocates the slots to the sensor device, otherwise, sequentially drops the guaranteed-time-slots requests from the sensor devices of the energy-saving-first type until the guaranteed-time-slots request from the sensor device of the throughput-first type is fulfilled. Finally, the method 700 ends at step S705. Apparently, upon receipt of the GTS request command, the PAN coordinator may utilize the type of the sensor device to implement more efficient GTS management for supporting multimedia services in WSNs. The architecture diagram shown with the flow diagram of FIG. 7 illustrates an architecture that may implement the steps of FIG. 5 and FIG. 7.

Figure 8:
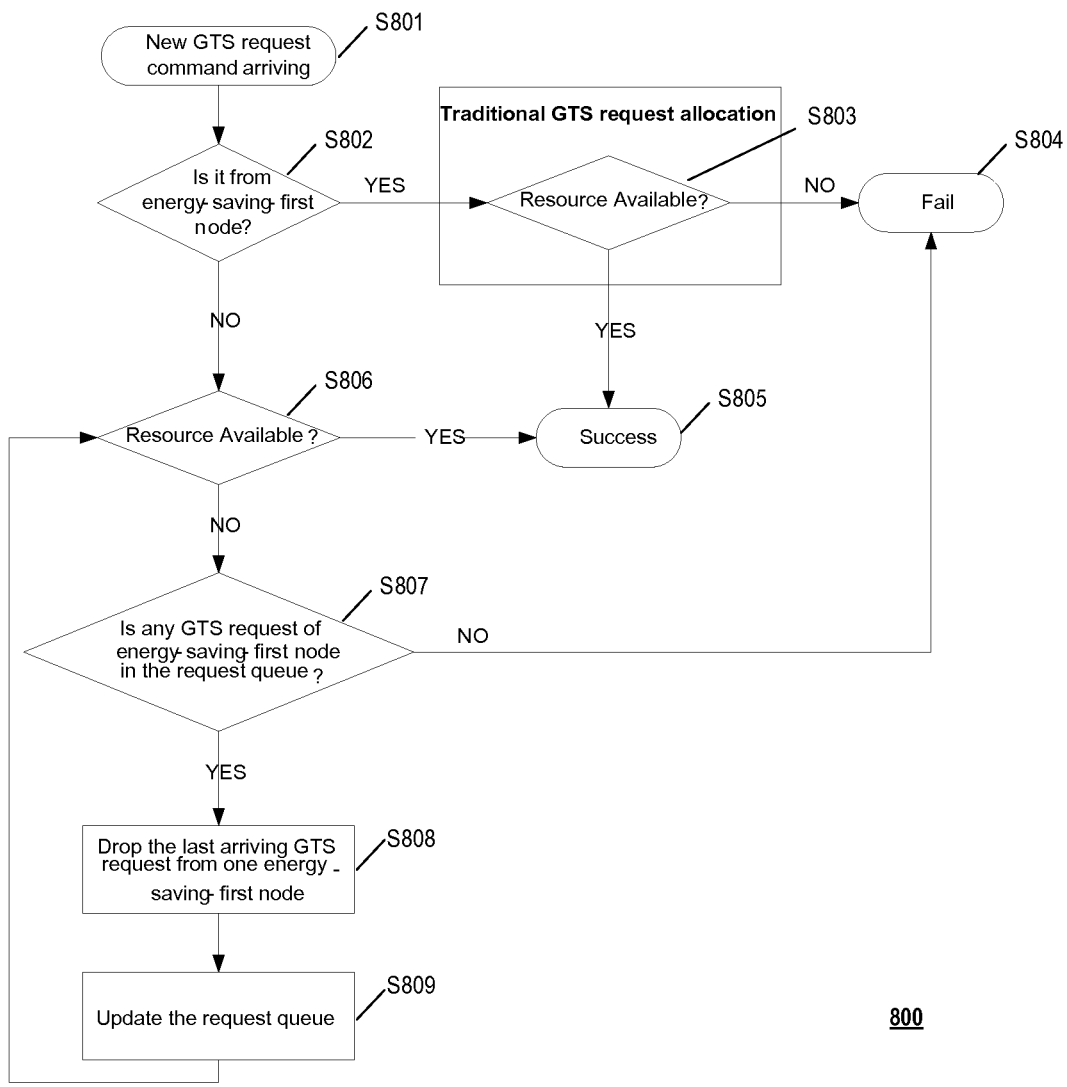
FIG. 8 is a detailed process flow diagram illustrating a method for communication in a personal area network according to an embodiment of the present invention.

FIG. 8 is a detailed process flow diagram illustrating a method 800 for communication in a personal area network according to an embodiment of the present invention. As illustrated in FIG. 8, the method begins at step S801 where it receives a new GTS request. Then, the method proceeds to step S802, wherein the type of the sensor device is determined based upon the reserved bit in the GTS characteristics field of a GTS request command frame. If it is determined that the GTS request is from the energy-saving-first sensor device, then the method 800 proceeds to step S803, wherein a traditional GTS request allocation is performed. If resource is available, then it would be allocated to the sensor device and this request is fulfilled. Then the method 800 ends in success at step S805. Otherwise, the method 800 ends in failure at step S804.

If it is determined that the GTS request is from the throughput-first sensor device, then at step S806, the method 800 determines whether the resource is available. If the resource is available, then the method 800 ends in success at step S805. Otherwise, the method 800 proceeds to step S807, wherein it is determined whether there exists any GTS request of the energy-saving-first sensor devices in a request queue. If this is the case, then at step S808, the method 800 drops the last arriving GTS request from one energy-saving-first sensor device and then updates the request queue. Next, the method 800 returns to step S806 to loop again.

If at step S807, the method 800 determines that there is no any GTS request of the energy-saving-first sensor devices in the request queue. Then the method 800 ends in failure at step S804.

With the method 800 of the present invention, the throughput-first sensor devices, or more specifically, the multimedia sensor devices, are much more likely to obtain GTS slots for improving transmission of the multimedia data. In other words, multimedia data traffic transmission would be given a higher priority and more GTS slots would be allocated to the multimedia sensor devices for increasing multimedia data throughput without increasing active duration.

Exemplary embodiments of the present invention have been described above with reference to block diagrams and flowchart illustrations of methods and apparatuses (i.e., systems). It should be understood that each block of the block diagrams and flowchart illustrations, and combinations of blocks in the block diagrams and flowchart illustrations, respectively, can be implemented in various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for communication in a personal area network, comprising:
    transmitting, to a personal area network coordinator, joint information of a sensor device, wherein the joint information is indicated by reserved bits in a frame control field of a media access control data frame, and wherein the joint information includes a type, an overall successful channel access rate, and a latest node buffer occupation rate of the sensor device, the latest node buffer occupation rate comprising an indication of a risk of buffer overflow in the sensor device;
    receiving, from the personal area network coordinator, information regarding adjusted active duration and duty cycle of the communication of the sensor device, wherein the adjustments of the active duration and duty cycle are determined based upon the joint information;
    performing further communication based upon the adjusted active duration and duty cycle; and
    using bits included in the reserved bits in a media access control beacon frame control field and received from the personal area network coordinator to set values of bits indicative of the overall successful channel access rate and the latest node buffer occupation rate, wherein a combination of bits included in the reserved bits in the media access control beacon frame control field represent various predetermined combination values of the overall successful channel access rate and the latest node buffer occupation rate compared against which values of the bits indicative of the overall successful channel access rate and the latest node buffer occupation rate are set.

2. The method as recited in claim 1, wherein the type of the sensor device comprises an energy-saving-first type or a throughput-first type.

3. The method as recited in claim 1 further comprising:
    transmitting, to the personal area network coordinator, a guaranteed-time-slots request, wherein the guaranteed-time-slots request includes information regarding a type of the sensor device indicated by a reserved bit, the type being an energy-saving-first type or a throughput-first type.

4. The method as recited in claim 3, wherein the information regarding the type of the sensor device is indicated by the reserved bit in a guaranteed-time-slots characteristics field of a guaranteed-time-slots request command frame.

5. A method for communication in a personal area network, comprising:
    receiving, from a sensor device, joint information which is indicated by reserved bits in a frame control field of a media access control data frame, and wherein the joint information includes a type, an overall successful channel access rate, and a latest node buffer occupation rate of the sensor device, the latest node buffer occupation rate comprising an indication of a risk of buffer overflow in the sensor device;
    adjusting, based upon the joint information, an active duration and a duty cycle of the communication of the sensor device;
    transmitting information regarding the adjusted active duration and duty cycle to the sensor device; and
    prior to receiving the joint information, transmitting bits included in the reserved bits in a media access control beacon frame control field to the sensor device, wherein a combination of the bits represent various predetermined combination values of the overall successful channel access rate and the latest node buffer occupation rate compared against which values of the bits indicative of the overall successful channel access rate and the latest node buffer occupation rate in the joint information are set.

6. The method as recited in claim 5, wherein the type of the sensor device comprises an energy-saving-first type or a throughput-first type.

7. The method as recited in claim 6, wherein the type of the personal area network is dynamically divided into an energy-saving-first type or a throughput-first type based upon the number of the sensor devices of the energy-saving-first type or the throughput-first type, or the amount of the traffic in the person area network.

8. The method as recited in claim 6, wherein the adjusting further comprises:

calculating a PAN-wide overall successful channel access rate $\overline{SAR}$ based upon a function $F(_{TypeWeight(1),\ SAR(1),\ TypeWeight(2),\ SAR(2),\ \ldots,\ TypeWeight(n),\ SAR(n)})$, wherein TypeWeight(i) denotes a value of the bit indicative of the type of the i$^{th}$ sensor device or a value configured based upon the types of the i$^{th}$ sensor device and the personal area network, SAR(i) denotes a value of the bit indicative of the overall successful channel access rate of the i$^{th}$ sensor device, n denotes a number of the sensor devices in the personal area network;

calculating a PAN-wide latest node buffer occupation rate $\overline{BOR}$ based upon a function $G(_{TypeWeight(1),\ BOR(1),\ TypeWeight(2),\ BOR(2),\ \ldots,\ TypeWeight(n),\ BOR(n)})$, wherein BOR(i) denotes a value of the bit indicative of the latest node buffer occupation rate of the i$^{th}$ sensor device;

calculating an adjustment parameter $\overline{AI}$ based upon a function $H(\overline{SAR},\overline{BOR})$, adjusting the active duration and the duty cycle based upon the adjustment parameter.

9. The method as recited in claim 8, wherein the function $$F(TypeWeight(1), SAR(1), TypeWeight(2), SAR(2), \ldots ,$$
$$TypeWeight(n), SAR(n)) = \left(\frac{1}{n}\sum_{i=1}^{n} TypeWeight(i)^K \times SAR(i)^L\right)^{1/L},$$

wherein the K and L are real numbers.

10. The method as recited in claim 8, wherein the function $$G(TypeWeight(1), BOR(1), TypeWeight(2), BOR(2), \ldots ,$$
$$TypeWeight(n), BOR(n)) = \left(\frac{1}{n}\sum_{i=1}^{n} TypeWeight(i)^P \times BOR(i)^Q\right)^{1/Q},$$

wherein the P and Q are real numbers.

11. The method as recited in claim 8, wherein the function $$H(\overline{SAR}, \overline{BOR}) = \frac{\overline{SAR}}{\overline{BOR}}.$$

12. The method as recited in claim 8, further comprising adjusting the active duration and the duty cycle based upon a change ratio of the adjustment parameter $\overline{AI}$, wherein the change ratio is calculated based upon the following equation:

$$\text{the change ratio} = \frac{(\overline{AI_{new}} - \overline{AI_{old}})}{\overline{AI_{old}}},$$

wherein the $\overline{AI_{new}}$ denotes the latest $\overline{AI}$ and the $\overline{AI_{old}}$ denotes the previous $\overline{AI}$.

13. The method as recited in claim 5 further comprising:

receiving a guaranteed-time-slots request from the sensor device, wherein the guaranteed-time-slots request includes information regarding a type of the sensor device indicated by a reserved bit, the type being an energy-saving-first type or a throughput-first type;

determining the type of the sensor device; and allocating time-slots to the sensor device of the throughput-first type.

14. The method as recited in claim 13, further comprising prior to the allocating, checking whether there are sufficient slots to be allocated, if so, then allocating the slots to the sensor device, otherwise, sequentially dropping the guaranteed-time-slots requests from the sensor devices of the energy-saving-first type until the guaranteed-time-slots request from the sensor device of the throughput-first type is fulfilled.

15. The method as recited in claim 13, wherein the reserved bit is in a guaranteed-time-slots characteristics field of a guaranteed-time-slots request command frame.

16. A method for communication in a personal area network, comprising:

transmitting, to a personal area network coordinator, joint information of a sensor device, wherein the joint information is indicated by reserved bits in a frame control field of a media access control data frame, and wherein the joint information includes a type, an overall successful channel access rate, and a latest node buffer occupation rate of the sensor device;

receiving, from the personal area network coordinator, information regarding adjusted active duration and duty cycle of the communication of the sensor device, wherein the adjustments of the active duration and duty cycle are determined based upon the joint information;

performing further communication based upon the adjusted active duration and duty cycle; and using bits included in the reserved bits in a media access control beacon frame control field and received from the personal area network coordinator to set values of bits indicative of the overall successful channel access rate and the latest node buffer occupation rate, wherein a combination of bits included in the reserved bits in the media access control beacon frame control field represent various predetermined combination values of the overall successful channel access rate and the latest node buffer occupation rate compared against which values of the bits indicative of the overall successful channel access rate and the latest node buffer occupation rate are set.

* * * * *